Nov. 2, 1965   H. SCHILL   3,215,179
MACHINE FOR SLICING OFF THE RIND OR OTHER TEGUMENT
FROM BACON, MEAT, FLESH, FISH OR THE LIKE
Filed May 29, 1963   3 Sheets-Sheet 1

Inventor
Hermann Schill
by Michael S. Striker
Atty

Nov. 2, 1965 H. SCHILL 3,215,179
MACHINE FOR SLICING OFF THE RIND OR OTHER TEGUMENT
FROM BACON, MEAT, FLESH, FISH OR THE LIKE
Filed May 29, 1963 3 Sheets-Sheet 2

Inventor
Hermann Schill
by Michael S. Striker
Atty

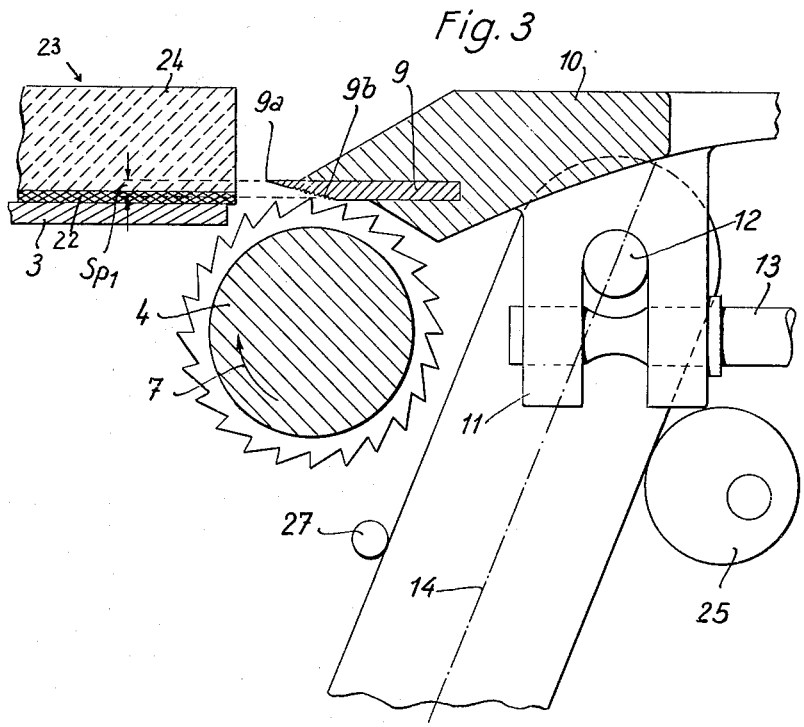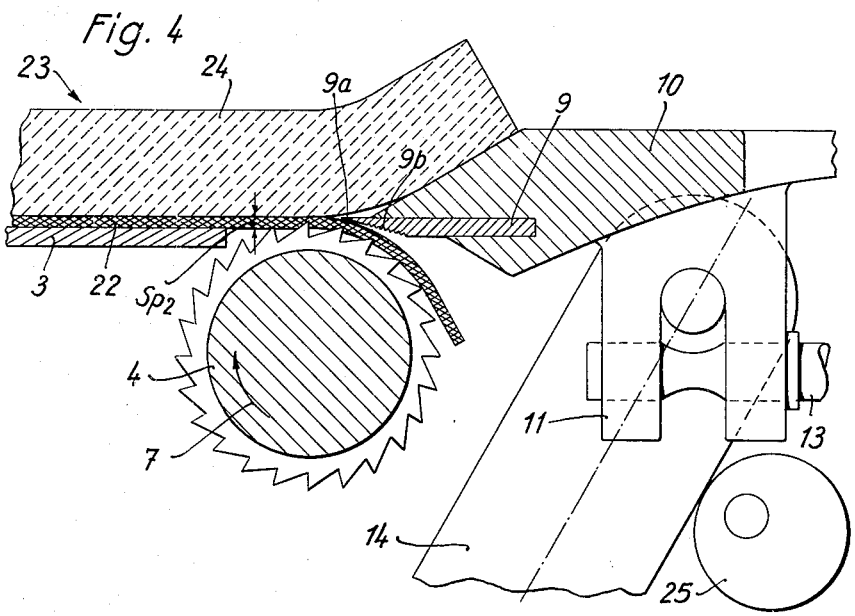

United States Patent Office 3,215,179
Patented Nov. 2, 1965

3,215,179
MACHINE FOR SLICING OFF THE RIND OR OTHER TEGUMENT FROM BACON, MEAT, FLESH, FISH OR THE LIKE
Hermann Schill, 212 Schulstrasse, Goldscheuer, near Offenburg, Germany
Filed May 29, 1963, Ser. No. 284,251
Claims priority, application Germany, June 23, 1962, M 53,317
9 Claims. (Cl. 146—130)

This invention relates to a machine for slicing off the rind or other tegument from bacon, meat, flesh, fish or the like and is a continuation-in-part of the application filed by me on September 2, 1959, Serial No. 837,736, now U.S. Letters Patent No. 3,100,515, and embodies improvements in the art thereover.

The machine to which the invention more particularly relates is one in which a feed roller feeds the bacon or the like against the cutting edge of a slicing knife detachably affixed to a yieldingly mounted knife holder.

The principal object of the invention is to provide a machine of the specified kind in which the clearance between the cutting edge of the slicing knife and the periphery of the feed roller, which determines the thickness of the cut for removing the rind is conveniently and precisely adjustable. It is also envisaged that the cutting edge of the knife should automatically return into the best position for starting the cut when a fresh piece of bacon or the like is presented to the machine, without interfering with freedom of access of the bacon or the like to the feed roller.

To achieve this object, the invention provides a machine for slicing off the rind or the like from bacon, meat, flesh or the like, which comprises a slicing knife and a feed roller arranged to draw the bacon or the like against the cutting edge of the slicing knife in a manner seeking to displace the cutting edge of said knife in the direction of feed into closer proximity with the circumference of the feed roller against the resistance of a restoring force urging the knife forwards contrary to the direction of feed, the knife being mounted in a holder attached to at least one swing arm deflectable about a fulcrum located on a pedestal of the machine below the level of the top of the feed roller.

It is preferred to locate the fulcrum of the swing arm or arms or equivalent elements below and, by reference to the direction of feed of the bacon, in front of the axis of rotation of the feed roller. Moreover, it may be desirable to guide the knife holder by one or more swing arms as well as by a bearing face on the underside of the knife holder supported by a roller. In such a case the swing arm and the bearing face should conveniently be so located that the resultant virtual centre or centres about which the cutting edge of the knife will swing is below and, by reference to the direction of feed, preferably in front of the axis of rotation of the feed roller.

Moreover, the bearing face of the knife holder preferably cooperates with a roller adapted to apply thrust to the bearing face in a manner calculated to urge the knife forward contrary to the direction of feed of the bacon into a position in which the cutting edge of the knife first makes contact with a fresh piece of bacon. Expediently a means is provided for adjusting the thrust applied by the roller to the bearing face of the knife holder. The thrust may be generated by an adjustable spring.

Furthermore, for limiting the rearward displacement of the knife the machine may be provided with stop means in the form of an adjustable eccentric suitably disposed to intercept at least one of the deflected swing arms. Moreover, a readily detachable connection between the knife holder and the swing arm or arms may be conveniently provided. This connection may be constituted by a fork-shaped yoke on the underface of the knife holder embracing a pin on the deflectable end of the swing arm or arms, said pin being secured in the fork-shaped yoke by a simple knock-out retaining pin.

According to another feature of the invention the underside of the knife may be provided with a milling or like flutings or roughenings.

A preferred embodiment of the invention will now be described by way of example and with reference to the accompanying drawings, in which:

FIG. 3 is an enlarged fragmentary vertical section showing the position of a piece of bacon immediately before engagement by the edge of the blade of the slicing knife;

FIG. 4 is a similar view of the same piece of bacon during the slicing operation, and FIG. 5 is a vertical section through the assembly comprising the thrust roller.

Figure 1:
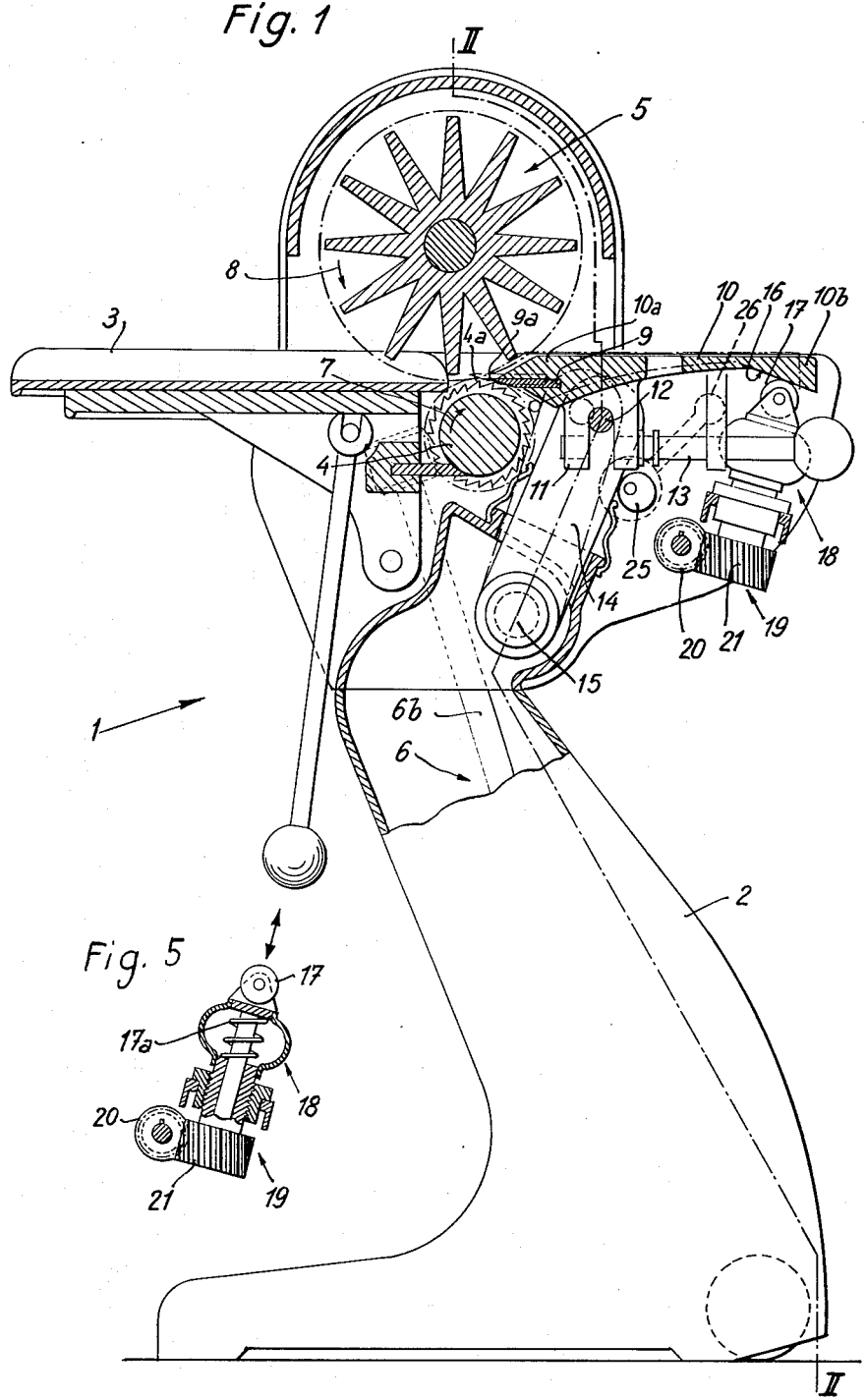
FIG. 1 is a side elevation, partly in section, of a machine according to the invention.
Figure 2:
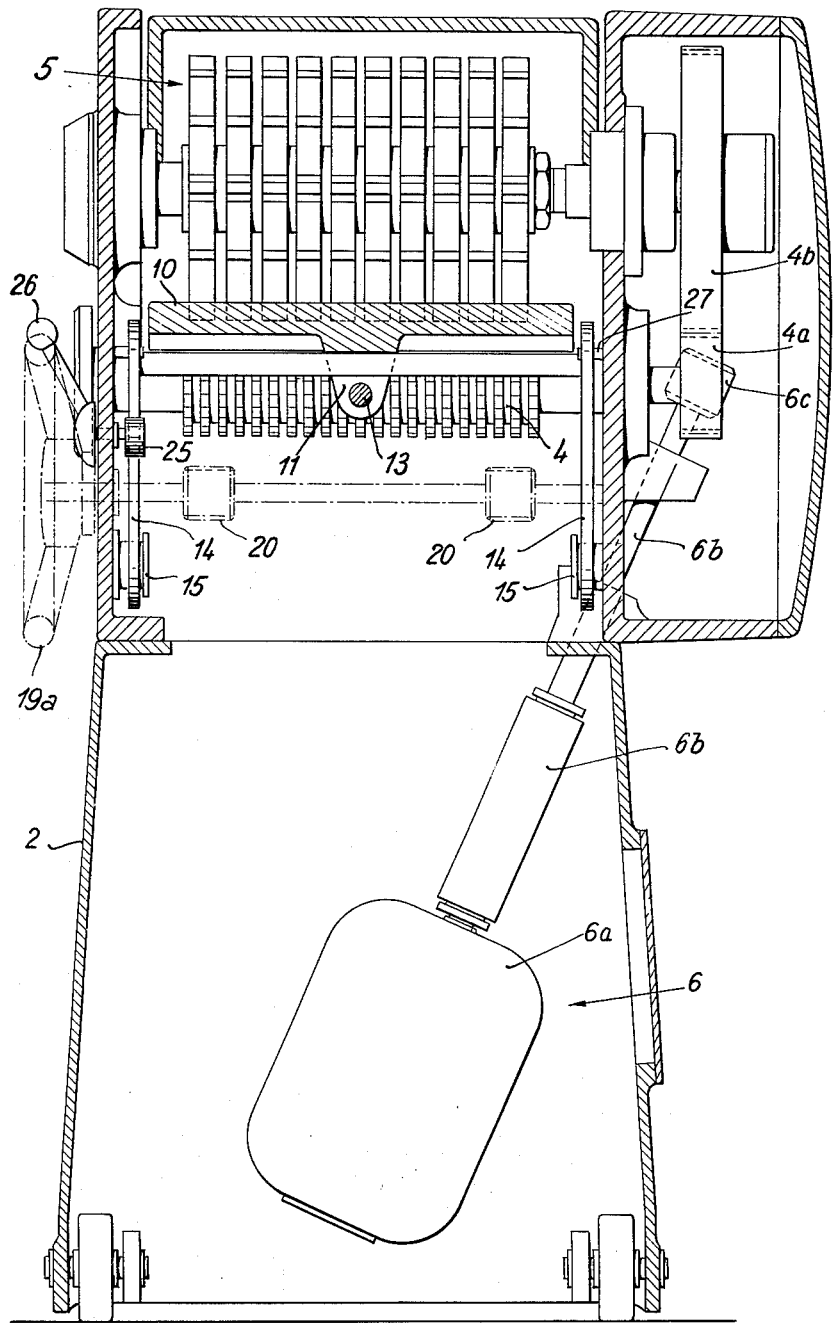
FIG. 2 is a vertical cross section through the machine on the line II—II of FIG. 1.

In FIG. 1 a machine for slicing off the rind from bacon is generally indicated at 1. It comprises a pedestal 2 supporting a feed table 3. At the machine end of the feed table 3 there is a feed roller 4 for transporting the bacon or meat from which the rind, skin or the like is to be removed. Above the feed roller 4 a counter-roller 5 is arranged which is made of elastic material, such as rubber or plastics, and principally serves to hold down the bacon 23 fed over the feed table 3 as shown in FIG. 4. The feed roller 4 rotates in the direction of the arrow 7 indicated in FIG. 1 and is driven by drive means generally indicated by 6. As shown in FIG. 2, the drive means 6 comprises a motor 6a which transmits torque through a shaft 6b and a gear wheel 6c to a further gear wheel 4a coupled with the feed roller 4. The counter-roller 5 is likewise positively driven by the drive means 6 through a gear wheel 5a in the direction of the arrow 8 indicated in FIG. 1.

The roller 4 feeds the bacon from which the rind is to be removed from left to right in FIG. 1. Above the roller 4 a knife 9 is exchangeably secured in a knife holder 10. The knife holder 10 is formed with a fork-shaped yoke 11 which embraces a pin 12 from above. A knock-out pin 13 closes the yoke 11 downwardly and retains the pin 12 in the yoke 11 from below. The two ends of the pin 12 are mounted in swing arms 14 which are deflectable about pivots 15. The knife holder 10 is provided with a bearing face 16 which rests on a roller 17.

In a roller supporting assembly generally indicated by 18 and shown in greater detail in FIG. 5 the roller 17 is mounted on a spring 17a which urges the roller 17 upwards in the axial direction of the roller supporting assembly. The spring thrust which acts on the roller 17 is controllable by adjusting means generally indicated by 19. The latter comprises a handwheel 19a (FIG. 2) and a pair of worm wheels 20 and 21.

As shown in FIG. 1, the knife holder 10 has a forward end 10a which due to the action of the roller supporting assembly 18 tends to deflectably move about the pivots 15 of the swing arms 14. It will be noted that the thrust of the spring 17a transmitted through the roller 17 tends to urge the knife holder 10 towards the feed table 3 although the bearing face 16 of the knife holder slopes downwards from left to right. However, the displacement of the knife holder 10 effected by the roller 17 is determined by the overall kinematics of the unit comprising the holder 10, the swing arms 14 and the pin 12, and by the disposition of the bearing face 16 and of the roller 17 supporting the bearing face.

In the illustrated embodiment of the machine 1 the fulcrum 15 of the swing arm 14 is situated considerably below as well as slightly to the rear of the axis of rotation of the feed roller 4. The knife holder 10 has a rearward end 10b supported by the roller 17. The angle of slope of the bearing face 16 and the disposition of the swing arms 14 combine to provide a mechanism for guiding the knife holder 10 in such a way that forward and backward movements of the holder 10 will carry the cutting edge 9a of the knife along a line which together with the peripheral surface of the feed roller 4 defines a rearwardly uniformly convergent channel. In its forward position, which is shown in dash lines in FIG. 1 and in greater detail in FIG. 3, there is a comparatively wide clearance $Sp_1$ between the feed roller 4 and the cutting edge 9a of the knife 9. This position shown in detail in FIG. 3 is the position in which the knife 9 starts to cut. In this position the clearange $Sp_1$ should be sufficient to ensure that the cutting edge 9a of the knife 9 will engage a layer of fat 24 of the bacon 23 above a rind 22.

However, as soon as the bacon 23 comes into contact with the knife 9, its forward thrust tends to displace the knife and its holder 10 backwards against the resistance due to the thrust of the spring 17a transmitted by the roller 17 to the rear end of the holder 10. The forward feed of the bacon 23 causes the knife 9 slightly to yield in the direction of feed of the bacon 23. Since as proposed by the invention the pivots 15 of the swing arms 14 are located below the level of the top of the feed roller 4, the periphery of the feed roller 4 and the path of deflection of the yielding cutting edge 9a of the knife are both curved in the same direction. Displacement of the knife holder 10 in the direction of feed of the bacon 23 from which the rind is to be removed therefore results in a progressive reduction of the clearance $Sp_1$ between the cutting edge 9a and the feed roller 4 to a final minimum clearance. The final positions of the knife holder 10 and of the knife 9 are adjustable by an eccentric 25 operable by an adjusting lever 26 shown in FIG. 2, the eccentric 25 determining the maximum deflection angle of at least one of the swing arms 14 as seen in FIG. 4. The eccentric 25 is self-locking and therefore permits the minimum clearance $Sp_1$ and hence the thickness of the cut for removing the rind to be continuously adjusted and fixed anywhere along the length of the bacon even whilst the machine is in operation.

The cutting thickness of the machine 1 can therefore be adjusted for consecutive pieces of bacon 23 whilst the machine continues to run. It is also readily possible to remove a thin layer of fat from the bacon 23 together with the ring 22.

The forward end position of the knife holder 10 is determined by a pin-shaped stop 27 which prevents the holder 10 or the knife 9 from contacting the feed roller 4.

An operational cycle of the machine 1 according to the invention proceeds as follows:

A piece of bacon 23 is first placed on the feed table 3 and pushed forward below the counter-roller 5 which holds the bacon down and also forwards it, if required. First the cutting edge 9a of the knife 9 is in its extreme forward position and engages the bacon 23 as shown in FIG. 3. The severed upper part of the bacon, i.e., the layer of fat 24, is then deflected over the top of the knife holder 10, whereas the lower part of the layer of fat 24 together with the rind 22 pass between the blade of the knife 9 and the feed roller 4. Substantially the bacon 23 is driven forward by the feed roller 4. The knife edge 9a is forced to yield to the thrust of the forwarded bacon and moves rearwards against the preadjusted restoring thrust, moving progressively closer inwards towards the circumference of the feed roller 4 until the required cutting clearance $Sp_2$ is reached as shown in FIG. 4. The rind 22 is pressed against the feed roller 4 which therefore grips the rind 22 tightly, pulling it away under the knife, whereas the layer of fat 24 of the bacon is deflected away over the top of the knife.

The restoring force acting on the knife holder 10 must be adjustable to the thrust which is applied to the knife by the bacon, depending for instance upon the width of the bacon 23 from which the rind is being removed. This adjustment is effected by the adjusting means 19. When the rind 22 of the piece of bacon 23 has travelled through the cutting clearance $Sp_2$ the restoring thrust of the spring returns the knife 9 with its cutting edge 9a in a position to start cutting again, as shown in FIG. 3, and the above described process can begin afresh.

The principal requirement in the present invention is that the movement of the knife holder 10 is such as to carry the cutting edge 9a of the knife along a curve which is arched conformably with the external periphery of the feed roller 4, and which together therewith defines a channel which continuously converges in the rearward direction. To this end, for instance, the fulcrum of a single swing arm guiding the holder 10 must be located below the level of the top of the feed roller or below and, in the direction of feed, in front of the axis of rotation of the feed roller. If the holder 10 is guided by several elements, such as the swing arms 14, the bearing face 16 and the roller 17, these must displace the holder and the cutting edge 9a of the knife 9 along paths which arch about virtual fulcra which satisfy the above-mentioned condition.

In the machine 1 as proposed by the invention the thrust acting on the roller 17 to urge the knife 9 into starting position may be generated by weights instead of by the spring 17a.

In order to facilitate cleaning of the machine, the knife 9 is arranged to be easily detachable from the holder 10. After removing the knock-out pin 13 from the downwardly open end of the yoke 11, the blade holder 10 can be easily lifted out. The machine 1 is then readily accessible from the rear.

In a further development of the invention the underface of the knife 9 may be provided with a milling 9b extending transversely of the direction of feed of the bacon 23. The object of this milling 9b is to ensure that narrow pieces of bacon which are easily sliced when the knife 9 is sharp will still apply sufficient thrust to the knife holder 10 to displace it from its starting position shown in FIG. 3 into the rearward cutting position shown in FIG. 4 against the preadjusted restoring thrust. It will also be readily understood that a conveyor system could be provided instead of the feed table 3.

This formerly described machine can also be used with the same advantages for skinning all kinds of fishes because there is also the same problem as in removing the rind from bacon, i.e., to remove the skin of the fish without cutting into the meat.

I claim:

1. A machine for slicing off the rind or the like from bacon, meat, fish or the like comprising, in combination, feeding means including a feed roller for feeding bacon or the like in one direction; a slicing knife having a cutting edge adjacent the periphery of said feed roller; mounting means mounting said slicing knife yieldable in said one direction and so that any point of said cutting edge will move, upon application of pressure by the material fed by said feeding means in said one direction against said cutting edge, from a rest position to a working position along a curve gradually approaching in said one direction the periphery of said feed roller so that said cutting edge will be spaced in said working position closer to said periphery of said feed roller than in said rest position; and stop means cooperating with said mounting means for stopping movement of said knife under application of pressure against said cutting edge at a position in which said cutting edge is at a predetermined distance from the periphery of said feed roller.

2. A machine as set forth in claim 1, wherein said stop means is adjustable to change said predetermined distance of said cutting edge from said periphery.

3. A machine for slicing off the rind or the like from bacon, meat, fish or the like comprising, in combination, feeding means including a feed roller for feeding bacon or the like in one direction; a slicing knife having a cutting edge adjacent the periphery of said feed roller; mounting means mounting said slicing knife yieldable in said one direction and so that any point of said cutting edge will move, upon application of pressure by the material fed by said feeding means in said one direction against said cutting edge, from a rest position to a working position along a curve gradually approaching in said one direction the periphery of said feed roller so that said cutting edge will be spaced in said working position closer to said periphery of said feed roller than in said rest position; stop means cooperating with said mounting means for stopping movement of said knife under application of pressure against said cutting edge at a position in which said cutting edge is at a predetermined distance from the periphery of said feed roller; and means cooperating with said mounting means for returning said slicing knife to said rest position in the absence of pressure on said cutting edge.

4. A machine for slicing off the rind or the like from bacon, meat, fish or the like comprising, in combination, a slicing knife having a cutting edge; feeding means including a feed roller for feeding bacon or the like in one direction against said cutting edge; and mounting means mounting said slicing knife yieldable in said one direction upon application of pressure by the material fed by said feeding means against said cutting edge and in such a manner that the cutting edge during such yielding of said knife moves into closer proximity to the circumference of said feed roller, said mounting means including a swing arm mounted at one end thereof turnably about a fixed axis located below the axis of said feed roller, a knife holder carrying at one end said slicing knife and being pivotally mounted intermediate its ends on the other end of said swing arm, said knife holder having at its other end a bearing face extending downwardly inclined to said one direction, and roller means engaging said bearing face for applying thereto a thrust in a direction so as to urge the knife in a direction opposite to said one direction.

5. A machine as claimed in claim 4, wherein a means is provided for adjusting the thrust applied by the roller means to the bearing face of the knife holder.

6. A machine as claimed in claim 4, wherein the thrust of the roller means on the bearing face of the knife holder is generated by an adjustable spring.

7. A machine as claimed in claim 4, wherein stop means are provided for limiting the rearward displacement of the knife, said stop means having the form of an adjustable eccentric which determines the rearward deflection of the swing arm supporting the knife holder.

8. A machine as claimed in claim 4, wherein the underface of the knife holder is formed with a fork-shaped yoke which embraces a pin on the deflectable end of the swing arm, said pin being secured in the fork-shaped yoke by a knock-out retaining pin.

9. A machine as claimed in claim 4, wherein the underface of the knife is provided with a milling extending transversely of the feed direction of the bacon.

References Cited by the Examiner
UNITED STATES PATENTS
2,659,402  11/53  Townsend _____ 146—130
FOREIGN PATENTS
453,759  12/49  Italy.
557,799  2/57  Italy.

J. SPENCER OVERHOLSER, *Primary Examiner.*